3,671,294
MOISTURE RESISTANT PACKAGING MATERIAL
Richard Konrad Hopermann, Oakland, N.J., assignor to The Borden Company, New York, N.Y.
No Drawing. Filed Dec. 20, 1967, Ser. No. 691,942
Int. Cl. B44d 1/16; B32b 27/10
U.S. Cl. 117—76     7 Claims

ABSTRACT OF THE DISCLOSURE

This invention relates to a printing ink system which functions as a moisture vapor barrier system. More particularly, this invention relates to a moisture vapor barrier system for materials used for packaging whereby a primer coat comprising either a vinyl halide or a vinylidene chloride copolymer is applied to a packaging material and dried. Thereafter, a top lacquer composition which includes at least about 70% of a cyclized natural rubber, by weight based on the weight of the dry top lacquer components, is applied to the packaging material. The resultant moisture barrier system has a moisture transmission rate of 2 grams or less of water vapor per 100 square inches over a period of 24 hours at 100° F. and 90% relative humidity.

BACKGROUND OF THE INVENTION

Many packaged materials, such as detergents and potato chips, must maintain a substantially constant moisture content in order to prevent the development of undesirable characteristics such as lack of brittleness of potato chips. When the material in which these types of products were packaged did not function as an effective moisture barrier, the shelf life of the product was shortened due to the moisture gain or loss by the product.

When packing materials were used which function as an effective moisture barrier, such packaging materials were often prohibitively costly.

It is an object of this invention therefore to develop a printing ink system which will be an effective moisture vapor barrier.

Another object of this invention is to enable normally unsuitable packaging materials to be used to package materials which require a substantially constant moisture content.

Other objects and advantages will become apparent from the following more complete description and claims.

SUMMARY OF THE DISCLOSURE

Broadly, this invention relates to a printing ink system which inhibits the amount of moisture transmitted through a substrate comprising (1) a primer composition which includes a resin selected from the group consisting of vinyl halide, vinylidene chloride, vinyl halide copolymers and vinylidene chloride copolymers, and a solvent therefore; (2) a top lacquer composition which includes at least about 70% of a cyclized natural rubber based on the weight of the dry top lacquer components, and a second solvent.

DETAILED DESCRIPTION

The compositions of this invention comprise a primer composition which is used to seal the pores of the packaging material.

The primer composition includes a resin and a solvent therefor. Generally, resins such as vinyl halides and their copolymers and vinylidene chloride and its copolymers may be used, dissolved in a solvent, to coat and surfaces seal the pores of the packaging material.

The amount of resin used in the primer composition is at least about 50% by weight of the dry primer composition. It is preferred however, to use between about 90% to 100% of the resin based on the weight of the dry components.

Among the resins which may be used are chlorinated rubber, vinyl chloride, vinylidene chloride, copolymers of vinyl chloride or vinylidene chloride with, for example, acrylonitrile, ethylene, propylene, vinyl acetate, and the like.

It has been found that when a top lacquer comprising cyclized natural rubber is applied to a packaging material as part of the printing ink system of this invention, a moisture vapor barrier is obtained which is a better barrier than when an equal number of coatings of an equal amount of either the primer composition or the top lacquer composition is applied to the packaging material in place of the system of this invention.

The resin of the primer composition is dissolved in a solvent. Generally, it is preferred that the solvent used for the primer composition be a ketone.

Among the solvents which may be used are methyl ethyl ketone, acetone, methyl isobutyl ketone, mesityl oxide, tetrahydro furan, cyclohexanone, isophorone, dimethyl formamide, and the like.

The amount of solvent used may vary up to about 85% by weight of the entire composition and preferably between about 70 to about 80 percent.

The top lacquer composition comprises cyclized rubber used in an amount of at least about 70% by weight of the dry top lacquer composition. If less than 70% is used, the moisture barrier properties may be adversely affected.

If desired, a stabilizer may be added to the primer composition to combat ultra violet and other degradation. The stabilizer which is added does not affect the moisture barrier properties of the system, but is added merely to preserve the esthetic qualities of the package which might otherwise be affected by a degraded primer composition.

The amount of stabilizer added may vary up to about 20% by weight of the dry primer composition. It is preferred, however, to use up to about 8.5%. Caution should be exercised when using amounts in excess of 8.5% because as the amount used is increased appreciably above 8.5% the moisture barrier properties of the system may be adversely affected.

Among the stabilizers which can be used are epoxidized soy bean oils, oil modified sebacic acid, tin maleate, calcium maleate, barium maleate, 2(2'-hydroxy-5-methylphenyl) benzothiazole, and the like.

A wax may also be added to the primer composition to enhance the moisture barrier properties of the system.

If a wax is present, it may be added in an amount up to about 15% by weight of the dry primer components. Amounts between about 3% to about 5% are preferred.

Any wax may be used which is soluble in the primer solvent at a temperature below the boiling point of the solvent and not in excess of 100° C.

Among the waxes which may be used are montan wax, ceresin wax, sugar cane wax, Chinese insect wax, paraffin wax and blends of paraffin wax with the above as well as with microcrystalline wax, phenol-formaldehyde resin and polyethylene. Synthetic waxes may also be used. For example, esters of ethylene glycol, diethylene glycol, polyethylene glycol, cetyl alcohol, stearyl alcohol, or sorbitol and the like with stearic, palmitic and myristic acids are satisfactory. Additionally, hydrogenated vegetable oils such as hydrogenated castor oil may be used as well as a Fischer-Tropsch wax, and the like.

The cyclized rubber of the top lacquer composition is also dissolved in a solvent. Generally, the top lacquer solvent will comprise between about 60% to about 85% of the weight of the entire top lacquer composition. It is preferred however, to use an amount between about 65% to about 70%.

Any solvent may be used which is sufficiently volatile and which is compatible with the components of the top lacquer composition. It is preferred however that the solvent used be an aliphatic hydrocarbon of up to about 12 carbon atoms such as hexane, octane, decane, dodecane, aromatic solvents such as toluene, xylene, benzene, and the like.

If desired, a wax may also be incorporated in the top laquer composition. The wax may be used in an amount up to about 20% by weight of the dry top lacquer composition. The waxes which may be used are those previously set forth in connection with the primer composition.

A drying agent may also be present in an amount of up to about 2% by weight of the dry top lacquer components and preferably up to about 1%. Although amounts in excess of 2% may be used, there is no advantage in using amounts greater than 2%.

Among the drying agents which may be used are, salts such as cobalt, manganese, lead, calcium, and the like, octoate, oleate, linoleate, resinate, stearate, naphthenate, ethylhexoate, lino-resinate, and the like.

An antioxidant may also be incorporated in the top lacquer composition. The antioxidant used preferably should be one which is volatile enough to evaporate during the printing process. The antioxidant is used in an amount of up to about 10% by weight of the dry lacquer components and preferably up to about 3%. Among the antioxidants which may be used are oximes such as methyl ethyl ketoxime di-tertiary-butyl-p-cresol, phenols such as 2,2-thiobis(4-methyl-6-tertiary butyl phenol) and the like.

In order to more fully illustrate the nature of this invention and the manner of practicing the same, the following examples are presented.

Unless specified otherwise, all weights expressed herein are based on the dry weight of the components present and exclude the weight of solvents.

EXAMPLE I

All parts expressed herein are parts by weight unless indicated otherwise.

Part A.—Preparation of primer composition

To 23 parts of toluene in a reaction vessel is added 1 part paraffin wax. This mixture is heated slowly to increase the rate of solution of the wax. To this mixture is then added with agitation, a premix of 42 parts of acetone, 12 parts methylethyl ketone, two parts of tin maleate.

20 parts of a copolymer composed of 80% vinylidene chloride and 20% acrylonitrile is then slowly added to the above. The mixture is homogeneously blended using agitation and heated slowly to effect a solution.

Part B.—Preparation of top lacquer 2 parts of paraffin wax by weight is added to a reaction vessel containing 20 parts heptane. The mixture is heated to effect a solution and 4 parts of heptane and 31.5 parts of hexane are then added to the heated solution and dissolved therein. The solution is cooled and 15 parts of a polyethylene wax composition is dissolved therein as is 26 parts of cyclized rubber. The polyethylene wax composition mentioned above consists of the following components and is prepared in the following manner.

To 65 parts of heptane, 15 parts of the cyclized rubber are added and dissolved therein. Thereafter, 20 parts polyethylene resin is added and dissolved with the aid of agitation and heat.

Part C.—Testing

A clay coated board measuring 9 x 12 inches is coated with the primer composition using the gravure printing method to produce a coating of 1.5 lbs. per ream of paper. This coating is dried and a top lacquer coating is applied using the gravure printing method. The top lacquer coating is applied to a thickness of 0.75 lb. per ream.

The moisture vapor transmission rate of the coated board is tested using the test published in July 1964 by the National Flexible Packaging Association and described at TR-15. The moisture vapor transmission rate is found to be 1.2 grams of water vapor per 100 square inches per 24 hours.

Part D.—Comparison

A clay board was coated to a thickness of 2.25 lbs. per ream using the gravure printing method and only the primer composition of Part A. The moisture vapor transmission rate is determined as aforedescribed and is found to be in excess of 2.5 grams per 100 square inches per 24 hours. This procedure is repeated using only the top lacquer composition of Part B to produce a coating of 2.25 lbs. per ream. The moisture vapor transmission rate of this coating when tested as aforedescribed is found to be in excess of 3 grams per 100 square inches per 24 hours.

EXAMPLE II

The procedure of Example I is repeated several times. Each time the resin used in preparing the primer composition is changed.

Among the resins used are chlorinated rubber, vinyl chloride, vinylidene chloride, a copolymer of vinyl chloride and acrylonitrile, a copolymer of vinylidene chloride and vinyl acetate, a copolymer of vinylidene chloride and propylene.

Good results are obtained each time.

EXAMPLE III

The procedure of Example 1 is repeated several times. Each time the amount of resin used in preparing the primer composition is varied. The resin is used in amounts by weight of the dry primer composition of 50%, 90%, and 100%.

Good results are obtained each time.

EXAMPLE IV

The procedure of Example I is again repeated except that the following waxes are used individually in the following amounts in place of the wax used in Example I.

| Wax: | Percent by weight of the dry primer components |
|---|---|
| Paraffin wax | 5 |
| Ceresin wax | 10 |
| Ester of ethylene glycol and stearic acid | 15 |
| Mixture of 90% paraffin wax and 10% polyethylene | 3 |
| Mixture of 90% paraffin wax and 10% polybutene | 2 |

Good results are obtained in each instance.

EXAMPLE V

The procedure of Example I is repeated except that the stabilizer used is varied. The stabilizers used are calcium maleate in an amount of 2% based on the weight of the dry primer components, and oil modified sebacic acid in an amount of 16% based as aforesaid.

Good results are obtained.

EXAMPLE VI

The procedure of Example I is repeated except that the wax used in Part B is varied. The wax used is microcrystalline wax in an amount of 4% based on the weight of the top lacquer components.

Good results are obtained.

EXAMPLE VII

The procedure of Example I is repeated except that 0.5 part of 68 cobalt octoate and 1 part of a ketoxime antioxidant are included.

Good results are obtained.

EXAMPLE VIII

The procedure of Example I is repeated except that 0.1 part of 2(2'-hydroxy-5'-methylphenyl)benzotriazole is included.

Good results are obtained.

I claim:

1. A moisture resistant packaging material comprising a paper base material having printed matter on one side of the packaging material and on the same side as the printed matter:
   (a) a dried residue of a solvent solution of a primer coating composition consisting essentially of at least 50% by weight, based on the weight of the dry primer composition of a resin of vinyl halide, vinylidene chloride, chlorinated rubber, copolymers of vinyl halide or vinylidene chloride with a member selected from the group consisting of vinyl acetate, acrylonitrile, ethylene and propylene, and
   (b) a dried residue of a solvent solution of a top lacquer coating composition applied over the primer composition comprising at least 70% of a cyclized natural rubber based on the weight of the dry-top lacquer components.

2. The packaging material according to claim 1, wherein the primer composition includes an ultraviolet stabilizer in an amount up to about 20% by weight.

3. The packaging material of claim 2, wherein the ultraviolet stabilizer as epoxidized soy bean oil, tin maleate, calcium maleate or barium maleate.

4. The packaging material according to claim 3, wherein said primer composition contains a wax which is soluble in the primer solvent below the boiling point of said solvent and up to 100° C., said wax being present in an amount of up to about 15% by weight.

5. The packaging material according to claim 1, wherein said top lacquer composition includes a wax in an amount of up to about 20% by weight.

6. The packaging material according to claim 1, wherein said top lacquer composition includes a drying agent in an amount up to about 10% by weight and an antioxidant in an amount up to about 10% by weight, said antioxidant being capable of volatilizing during the printing process.

7. A moisture resistant packaging material comprising a paper base material having printed matter on one side of the packaging material and on the same side as the printed matter.
   (a) a dried residue of a solvent solution of a primer coating composition consisting essentially of at least 50% by weight, based on the weight of the dry primer composition of vinylidene chloride, a wax in an amount of up to about 15% and a stabilizer of epoxidized soy bean oil or tin maleate; and
   (b) a dried residue of a solvent solution of a top lacquer composition coating comprising at least 70% of a cyclized natural rubber, based on the weight of the dry top lacquer components, a solvent therefor, a wax in an amount of up to about 20% by weight, a drying agent in an amount up to about 10% by weight, and a volatile antioxidant in an amount up to about 10% by weight.

References Cited

UNITED STATES PATENTS

| | | | |
|---|---|---|---|
| 3,157,530 | 11/1964 | Kane | 117—76 F |
| 2,431,028 | 11/1947 | Carson | 117—162 X |
| 3,132,041 | 5/1964 | Pihl | 117—76 P |
| 3,205,093 | 9/1965 | Lynch | 117—80 X |

WILLIAM D. MARTIN, Primary Examiner

R. HUSACK, Assistant Examiner

U.S. Cl. X.R.

99—171; 117—15, 80, 92; 252—90